Patented Aug. 24, 1954

2,687,381

UNITED STATES PATENT OFFICE 2,687,381

METHOD OF PREPARING A COBALT, MOLYBDENUM IMPREGNATED CATALYST COMPOSITE

Grant W. Hendricks, Compton, Calif., assignor to Union Oil Company of California, Los Angeles, Calif., a corporation of California No Drawing. Application April 16, 1949, Serial No. 88,046

7 Claims. (Cl. 252—470)

This invention relates generally to catalysts and to catalytic processes for the conversion of hydrocarbons and hydrocarbon mixtures. More particularly, this invention relates to a new and improved method for a preparation of catalysts comprising cobalt and molybdenum oxides supported on carriers and to methods for using such catalysts.

Supported catalysts containing cobalt and molybdenum have been prepared and described in U. S. Patent 2,393,288 issued to A. C. Byrns. The catalysts described therein were prepared by coprecipitating cobalt and molybdenum oxides in molecular combination as cobalt molybdate along with, or in the presence of, a suitable carrier such as alumina. A supported co-impregnated cobalt molybdate catalyst has been described in copending application 559,650 filed October 20, 1944, by P. G. Nahin et al., now U. S. Patent 2,486,361.

It has now been found that an improved cobalt-molybdenum catalyst supported on a suitable carrier can be prepared by a two-stage impregnation process described herein and that catalysts prepared by this new method are easier to prepare, possess superior activity and have other desirable features and properties.

It is an object of this invention to simplify the preparation of supported cobalt-molybdenum-containing catalysts and to improve the catalytic activity of such catalysts.

It is a further object of this invention to provide a method for the preparation of supported cobalt-molybdenum-containing catalysts which method affords greater control of the final catalytic composition during the preparation and manufacture.

It is another object of this invention to provide a new supported catalyst and to provide method for the use thereof for hydrocarbon conversion processes such as desulfurization, denitrogenation, hydrogenation, hydroforming and the like.

Briefly this invention relates to the preparation of a supported cobalt-molybdenum oxide catalyst which is prepared by the impregnation of the carrier in two separate and distinct steps. A suitable adsorbent carrier, e. g. activated alumina, alumina-silica, titania or the like is first immersed in an aqueous solution of a soluble molybdenum-containing salt, such as for example, an ammoniacal ammonium molybdate solution. The impregnated carrier is drained of the excess solution, is dried and heated to a temperature sufficient to decompose or oxidize the molybdenum-containing salt to form molybdic oxide. The carrier supporting the molybdic oxide is thereafter immersed in an aqueous solution of a soluble cobalt-containing salt such as for example aqueous cobaltous nitrate. The reimpregnated carrier is drained of the excess solution, dried, and heated to a temperature sufficient to decompose or oxidize the cobalt-containing salt to form cobalt oxide. The resulting catalyst may be employed for various hydrocarbon conversions described hereinafter such as desulfurization, denitrogenation, hydrogenation, hydroforming and the like.

The carriers which are suitable and may be employed for distending the mixture of cobalt and molybdic oxides according to the process in this invention comprise alumina, silica, zirconia, thoria, magnesia, magnesium hydroxide, titania or any combination of these. The preferred carrier is activated, gel-type alumina and particularly alumina gel containing about 3 to 8% of silica. The presence of the small amount of silica in the alumina serves to stabilize the resulting catalyst and prolongs the catalyst life as is described in U. S. Patent 2,437,532 to H. C. Huffman.

The carrier is normally shaped into the physical form desired for the catalyst prior to the impregnation steps. For this purpose the dried carrier is usually ground, mixed with a lubricant such as graphite or hydrogenated vegetable oil, and pilled. In the activation of the carrier the lubricant is removed by combustion. Alternatively the carrier may be used in granular form or ground into powder and extruded. Where the catalyst is to be employed in a fluidized process, such as in fluidized desulfurization, denitrogenation, and the like, the carrier is formed into a finely-divided state or is ground into a fine state and is thereafter impregnated. In the case of fluidized processes the carrier can be impregnated in larger form, e. g. granules, pills, etc., and thereafter ground to the desired powder size for the processing.

The molybdenum-containing impregnation solution is preferably ammoniacal ammonium molybdate although aqueous solutions of other soluble molybdenum compounds may be employed. In the preferred method, ammonium paramolybdate is dissolved in about 14% aqueous ammonia and the resulting mixture is diluted with distilled water or with more diluted aqueous ammonia to form a clear ammonium molybdate solution of the desired concentration. The concentration of the ammonium molybdate solution will depend on the particular carrier being employed and on the desired concentration of molybdenum in the finished catalyst. Where alumina or alumina-silica carriers are employed, and a finished catalyst comprising between about 6 to 16% of $MoO_3$ is desired, the molybdenum-containing impregnation solutions will have a concentration of molybdenum ranging from about 12 to 32 g. of $MoO_3$/100 ml.

The cobalt-containing impregnation solution is preferably an aqueous solution of cobaltous nitrate although other water-soluble compounds of cobalt may be employed. Thus cobalt chloride and cobalt sulfate may be employed in the impregnation solutions although these compounds are more difficultly decomposable to active forms and require both heat and oxidation to complete their conversion to the oxide. The concentration of the cobalt-containing impregnation solution will depend upon the carrier being employed and the desired concentration of cobalt in the finished catalyst. Where alumina or alumina-silica carriers are employed and where a final catalyst composition containing from about 2 to 10% by weight of CoO is desired, the concentration of the cobalt impregnation solution will range from about 4 to 23 g. of CoO/100 ml.

In the preparation of the catalyst the carrier is first activated by heating in order to render it sufficiently adsorbent to be impregnated. Such activation may for example be effected by heating for 2 to 6 hours at 500 to 600° C. The carrier is then cooled and immersed in the molybdenum-containing impregnation solution of the type described hereinbefore. The impregnation solution is absorbed by the carrier and the excess impregnation solution is thereafter removed. The impregnated carrier is drained and dried in a low temperature oven to remove the bulk of the water. Following the drying at, for example, 90 to 110° C. the mixture is activated by heating it to a temperature of, for example, 500° to 600° C. for two to six hours in order to decompose the molybdenum salt to $MoO_3$.

The carrier supporting the molybdic oxide is then cooled and immersed in the cobalt-containing impregnation solution of the type described hereinbefore, to absorb the cobalt-containing solution. The excess solution is again removed and the impregnated material is drained and dried at low temperature for example 90 to 110° C. The material is again activated by heating at 500° to 600° C. for two to six hours in order to decompose the cobalt-containing compound to cobalt oxide. The finished catalyst prepared by this method is usually reduced in the presence of hydrogen at a temperature between 700 and 1100° F. prior to its use.

The finished catalyst is useful for effecting various hydrocarbon conversion reactions such as desulfurization, denitrogenation, hydrogenation, hydroforming, reforming, cracking, destructive hydrogenation and the like. During usage varying amounts of deposits comprising mostly carbon, nitrogen and sulfur compounds accumulate on the catalyst and are periodically removed by regeneration. Regeneration is effected by passing air diluted with flue gas, steam, nitrogen or other inert gas over the catalyst to combust the deposits while maintaining the temperature of the catalyst between 800° and 1050° F. The combustion is completed in the presence of undiluted air while maintaining the temperature of the catalyst between 800° and 1050° F. The regenerated catalyst after reduction with hydrogen has practically the same catalytic activity as the freshly prepared catalyst even after a large number of regenerations.

For the purpose of desulfurizing petroleum stocks, shale distillates and the like, the catalyst of this invention is employed under the following conditions: reaction temperatures between about 600° to 1000° F., pressures between about atmospheric to 5000 lbs. per sq. in. or more and at space velocities between about 0.2 and 10.0 volumes of liquid feed stock per volume of catalyst per hour, and 500 to 10,000 cu. ft. of added hydrogen per barrel of feed. The particular set of conditions is determined by the stock to be desulfurized and by the nature of the product desired.

The catalyst in this invention can also be employed for denitrogenation of such stocks as coal tar distillates, shale oils and heavy petroleum distillates whereby up to 99% of the nitrogen and substantially 100% of the sulfur can be removed simultaneously. For denitrogenation of such stocks the following conditions are employed: reaction temperatures between about 700° and 1000° F., pressures between about 500 and 10,000 lbs. per sq. in., feed rates between about 0.2 and 10.0 volumes of liquid feed stock per volume of catalyst per hour, and about 1,000 to 10,000 cu. ft. of added hydrogen per barrel of feed. For the removal of nitrogen it is generally desirable to employ a two-stage denitrogenation process wherein the ammonia synthesized in the first stage is removed from the first-stage product prior to its entry into the second stage denitrogenation and wherein the ammonia and hydrogen sulfide are removed from the recycle hydrogen gas streams in each stage. Under these conditions the maximum efficiency for removing nitrogen from the stocks is obtained. The catalyst of this invention may also be employed for the process generally termed "hydroforming," which process serves to reform a gasoline range hydrocarbon stock and increase its aromatic content. For processing stocks for the purpose of reforming and increasing their aromaticity, the following conditions are employed: reaction temperatures between about 800° to 1200° F., pressures between about 50 to 1000 lbs. per sq. in., space velocities between about 0.2 and 4.0 volumes of liquid feed stock per volume of catalyst per hour, and about 1,000 to 10,000 cu. ft. of added hydrogen per barrel of feed. The specific conditions are determined by the nature of the specific feed stock employed and the quality of the product desired.

Although other compositions can be prepared by the method of this invention catalyst containing from about 7 to 22% by weight and preferably from about 10 to 16% by weight of cobalt plus molybdenum oxides are employed. It is preferable that the molecular ratio of cobalt oxide to molybdic oxide ($CoO/MoO_3$) be between about 0.2 and 5.0 for best results. Within these limits the preferred catalysts will contain between about 2 to 15% by weight of $MoO_3$ and between about 12 to 0.5% by weight of CoO.

Perhaps the process of this invention is best illustrated by the following specific examples.

EXAMPLE I

An alumina-silica gel containing an estimated 95% $Al_2O_3$ and 5% $SiO_2$ was prepared by the coprecipitation of an aqueous mixture of sodium aluminate and sodium silicate with carbon dioxide. The precipitate was washed until substantially free of sodium ions, dried at 90–110° C. and activated by heating for two hours at 600° C. A solution of ammonium molybdate was prepared by dissolving about 1700 parts by weight of ammonium paramolybdate, assaying about 81% by weight of $MoO_3$, in about 1940 parts by weight of 28% aqueous ammonia and about 1550 parts by weight of distilled water. About 4400 parts by weight of the activated gel were immersed in the ammoniacal solution of ammonium molybdate, drained, dried and heated at 600° C. for about two hours. An aqueous solution of cobalt nitrate was prepared by dissolving about 2150 parts by weight of cobalt nitrate hexa-hydrate in about 2000 parts by weight of water. The carrier supporting the molybdic oxide was then immersed in the cobalt nitrate solution, drained, dried and activated by heating to 600° C. for two hours. The catalyst prepared by this method contained about 9.1% $MoO_3$ and 4.4% $CoO$; the atomic ratio of Co/Mo was 0.93.

At the beginning of a run the catalyst was reduced at atmospheric pressure with hydrogen while controlling the rate to maintain the temperature below 1050° F. after which time reduction was completed under pressure, such as at the reaction pressure to be employed. While continuing the hydrogen flow through the catalyst the preheated feed stock was started through the catalyst bed and continued at the desired feed rate measured in terms of volumes of liquid feed stock per volume of catalyst per hour (also referred to herein as v./v.) and for the desired number of hours, after which time the hydrogen addition was continued for a short while in order to purge the catalyst of products.

The liquid product was cooled under pressure, withdrawn and washed with both caustic and water in order to remove any hydrogen sulfide and ammonia. The washed and dried product was thereafter employed as a feed stock for contacting a freshly regenerated and reduced catalyst in a second pass operation.

Employing the aforedescribed procedure a series of three double-pass runs were made with an educted shale oil distillate having the following characteristics:

Gravity, ° A. P. I. at 60° F_____ 27.2
Nitrogen, weight percent_____ 1.72
Sulfur, weight percent_____ 0.74

All of the runs were made with a hydrogen pressure of 1100 pounds per square inch gage and at a catalyst bed temperature of about 770° F. The added hydrogen was varied from 3.7 to 4.0 thousand cubic feet per barrel of feed. In each case fresh non-recycled, once-through hydrogen was employed. The data obtained are presented in accompanying Table 1 wherein column A represents data for a first-pass run and column B represents the data obtained by second-passing the product obtained in column A. Columns D and F similarly represent the second-pass data for first-pass runs reported in columns C and E, respectively.

The data shown in Table 1 show the high quality product obtained by two-pass processing for the removal of nitrogen. Considering columns A, C and D, it is apparent that where a catalyst is employed with a feed rate of 0.5 volume of feed stock per volume of catalyst a product containing 0.35% nitrogen can be obtained from a feed stock containing 1.72% nitrogen. If, however, the same volume of catalyst be divided into two equal portions and the same feed stock be denitrogenated in two stages, first over the first portion of catalyst and second over the second portion of catalyst with intervening cooling of the product and washing to separate ammonia and hydrogen sulfide therefrom and with the use of uncontaminated hydrogen in the second stage, a product containing only 0.11% nitrogen can thereby be obtained.

It is also apparent that a product containing only 0.07% nitrogen by weight can be obtained from a feed stock containing 1.72% nitrogen by first processing the feed stock at a 0.5 v./v. and subsequently processing the first-pass product in a second stage operated at a 1.0 v./v.

Excellent sulfur removal is shown for the first-pass product while second-pass processing is necessary in order to reduce the nitrogen to a correspondingly low figure.

EXAMPLE II

When titania gel is substituted for the alumina-silica gel in the catalyst preparation and processing described in Example I, substantially the same favorable results are obtained.

EXAMPLE III

A series of three cobalt molybdate catalysts supported on alumina were prepared by the co-precipitation method disclosed in the Byrns patent cited hereinbefore. A fourth cobalt molybdate catalyst was prepared by the co-impregnation method described in copending application of Nahin et al. cited hereinbefore. The four catalysts were then employed for desulfurizing a gas oil distillate from a Santa Maria Valley (California) crude oil. In each instance the catalyst was first reduced and then employed for the desulfurization for an operating cycle of six hours under the following conditions: a temperature of about 705° F., a pressure of 150 pounds per sq. in., space velocity of 1.0 and with 3000 cu. ft. of added fresh hydrogen per barrel of feed. In each case the product of the reaction was cooled, washed with caustic to remove hydrogen sulfide, washed with distilled water and subsequently dried. The four products were then analyzed for sulfur. The data obtained from this series of four runs appear in accompanying Table 2.

Table 1

| Column | A | B | C | D | E | F |
|---|---|---|---|---|---|---|
| Pass | 1st | 2nd | 1st | 2nd | 1st | 2nd |
| Conditions of Run: | | | | | | |
| Catalyst Temp., ° F | 770 | 770 | 770 | 770 | 770 | 770 |
| Pressure, lb./sq. in. g | 1,100 | 1,100 | 1,100 | 1,100 | 1,100 | 1,100 |
| Added Hydrogen, MCF/bbl. of feed | 4.0 | 3.7 | 4.0 | 3.8 | 3.8 | 3.8 |
| Run Length, hrs | 24 | 6 | 12 | 6 | 6 | 6 |
| Vol. feed/vol. catalyst/hour | 0.5 | 1.0 | 1.0 | 1.0 | 2.0 | 1.0 |
| Product Analysis: | | | | | | |
| Nitrogen, Wt. Percent | 0.35 | 0.07 | 0.56 | 0.11 | 0.80 | 0.22 |
| Sulfur, Wt. Percent | 0.06 | 0.02 | 0.09 | 0.04 | 0.13 | 0.04 |
| Carbon on Catalyst, Wt. Percent | 5.55 | 2.51 | 5.08 | 3.12 | 4.91 | 3.15 |
| Hydrogen Consumption, cu. ft./bbl. of feed | 950 | nil | 850 | nil | 650 | (30) |

Table 2

| Method of Preparation | Byrns | Byrns | Byrns | Nahin |
|---|---|---|---|---|
| Composition of Catalyst: | | | | |
| CoO, weight percent | 13.1 | 7.1 | 5.7 | 4.9 |
| $MoO_3$, weight percent | 12.2 | 4.5 | 2.9 | 7.4 |
| CoO+$MoO_3$, weight percent | 25.3 | 11.6 | 8.6 | 12.3 |
| Sulfur in Product, weight percent | 0.15 | 0.23 | 0.29 | 0.09 |

EXAMPLE IV

In this example a series of five impregnated catalysts were prepared by three different impregnation procedures. Catalyst 1 and 2 were co-impregnated catalysts prepared according to the method described by Nahin et al. in the copending application previously cited.

In the preparation of catalyst 1 an ammonical ammonium molybdate solution was prepared by dissolving 104 parts by weight of ammonium paramolybdate in a mixture of 190 parts by weight of 28% aqueous ammonia and 123 parts by weight of distilled water. A cobalt-containing solution was prepared by dissolving 155 parts by weight of cobaltous nitrate hexahydrate in 65 parts by weight of distilled water. The cobalt-containing solution was added slowly and dropwise into the molybdenum solution while rapidly stirring the molybdenum solution. A co-precipitated carrier containing about 95% by weight of alumina and about 5% by weight of silica was activated by heating for six hours at 600° C. About 420 parts by weight of the activated carrier were immersed in the mixed solution for one hour, drained of the excess solution, dried overnight at 90° to 110° C. and finally heated for two hours at 600° C.

Catalyst 2 was prepared in substantially the same manner as catalyst 1 using a slightly different impregnation solution.

Catalysts 3, 4 and 5 were prepared by separately impregnating cobalt and molybdenum in two impregnation stages with the cobalt being deposited first and the molybdenum second in the case of catalyst 3, and with the molybdenum being deposited first and the cobalt second in the case of catalysts 4 and 5.

Catalyst 3 was prepared as follows: about 420 parts by weight of the activated alumina-silica carrier were immersed in an aqueous cobaltous nitrate solution prepared by dissolving 155 parts by weight of cobaltous nitrate hexahydrate in about 415 parts by weight of distilled water. The impregnated carrier was drained, dried and calcined for two hours at 600° C. The carrier supporting the cobalt oxide was then immersed in an ammoniacal ammonium molybdate solution prepared by dissolving 104 parts by weight of ammonium paramolybdate in a mixture of about 225 parts by weight of 28% aqueous ammonia and about 208 parts by weight of distilled water. The impregnated mixture was drained of the excess solution, dried and activated by heating for two hours at 600° C.

Catalyst 4 was prepared as follows: about 420 parts by weight of the activated alumina-silica carrier were immersed in an ammoniacal ammonium molybdate solution prepared by dissolving about 104 parts by weight of ammonium paramolybdate in a mixture of about 225 parts by weight of 28% aqueous ammonium hydroxide and about 233 parts by weight of distilled water. The impregnated carrier was drained of the excess solution, dried and calcined for two hours at 600° C. The carrier supporting the molybdic oxide was thereafter immersed in an aqueous solution of cobaltous nitrate prepared by dissolving about 155 parts by weight of cobaltous nitrate hexahydrate in about 390 parts by weight of distilled water. The impregnated carrier was drained of the excess solution, dried and activated by heating for two hours at 600° C.

Catalyst 5 was prepared in the same manner as catalyst 4 with the exception that the concentration of each of the two solutions was changed to give a different catalyst composition.

The five catalysts were separately reduced and each was employed for desulfurizing of a straight run gas oil distillate from a Santa Maria Valley crude oil similar to that described in Example III. The gas oil feed stock contained 2.33% by weight of sulfur and had a 33.2 A. P. I. gravity. The following operating conditions were employed for the desulfurization: a reaction temperature of about 750 F., a space velocity of 2.0 volumes of feed stock per volume of catalyst per hour, a pressure of 150 pounds per sq. in. gage, an operating cycle of six hours and 3000 cu. ft. of added hydrogen per barrel of feed. The products from each of the runs was processed in the manner described in Example I. The data obtained therefrom are shown in accompanying Table 3.

Table 3

| Catalyst number | 1 | 2 | 3 | 4 | 5 |
|---|---|---|---|---|---|
| Method of impregnation | Co+Mo | Co+Mo | Co first, Mo second. | Mo first, Co second. | Mo first, Co second. |
| Composition: | | | | | |
| $MoO_3$ weight percent | 6.2 | 9.4 | 9.6 | 9.2 | 10.1 |
| CoO, weight percent | 3.6 | 5.5 | 4.5 | 4.3 | 3.8 |
| CoO+$MoO_3$ | 9.8 | 14.9 | 14.1 | 13.5 | 13.9 |
| Examination of product: | | | | | |
| Liquid recovery, volume percent | 97.2 | 96.7 | 98.9 | 98.1 | 98.1 |
| Sulfur in product, weight percent | 0.21 | 0.16 | 0.22 | 0.17 | 0.17 |
| Acid solubility, volume percent | 28.0 | 26.5 | 27.8 | 28.8 | 28.8 |
| Olefins, volume percent | 4.2 | 3.3 | 3.1 | 3.4 | 3.4 |

It is apparent that highly active desulfurization catalysts are prepared by impregnating the carrier in two separate stages wherein the molybdenum is deposited in the first impregnation stage and cobalt is deposited in the second. The two-stage impregnated catalysts, wherein the $MoO_3$ is deposited first and the CoO second, are superior to the single stage coimpregnated catalysts in that they give a higher yield liquid product which are also somewhat richer in aromatics as determined by substracting the olefin content from the acid soluble content. A comparison of catalyst 3 with 4 and 5 shows that better desulfurization is obtained if the $MoO_3$ is deposited first, rather than the CoO first, in the two-stage process.

EXAMPLE V

Catalysts 2, 3 and 5 prepared as described in Example III were also tested for the hydroforming of a naphthene-rich straight run distillate having an A. P. I. gravity of 52.7 and containing about 12.7 volume per cent aromatics. The following conditions were employed: A process period of four hours, a space velocity of 1.0 volumes of feed stock per volume of catalyst per hour, a pressure of 100 pounds, an isothermal block temperature of 950° F. (temperature of large steel block surrounding the reactor tube) and 3000 cu. ft. of fresh added hydrogen per barrel of feed. The products of the runs were analyzed for aromatic content and the amount of synthetic aromatics was calculated by assuming that the aromatics originally present in the feed stock passed through the reactor unchanged and were completely recovered in the products. The hydroforming data for synthetic aromatics are shown in accompanying Table 4.

Table 4

| Catalyst number | 2 | 3 | 5 |
|---|---|---|---|
| Method of impregnation | Co+Mo | Co first, Mo second. | Mo first, Co second. |
| Composition: | | | |
| CoO, weight percent | 9.4 | 9.6 | 10.1 |
| MoO₃, weight percent | 5.5 | 4.5 | 3.8 |
| CoO+MoO₃, weight percent | 14.9 | 14.1 | 13.9 |
| Synthetic aromatics, volume percent of feed | 30.2 | 31.1 | 34.5 |

The foregoing disclosure of my invention is not to be considered as limiting since many variations may be made by those skilled in the art without departing from the scope or spirit of the following claims:

I claim:

1. A method of preparing a catalyst consisting essentially of a minor proportion of cobalt oxide plus molybdenum oxide and a major proportion of a carrier which comprises impregnating an adsorbent carrier with an aqueous solution of a compound of one metal selected from the class consisting of cobalt and molybdenum, decomposing said compound during heating to form the corresponding metal oxide on said carrier, impregnating said carrier with an aqueous solution of a compound of the other of said metals and decomposing said compound during heating to form the corresponding metal oxide of said other metal.

2. A method of preparing a catalyst according to claim 1 wherein said carrier is first impregnated with an aqueous solution of a cobalt compound, and is thereafter impregnated with an aqueous solution of a molybdenum compound.

3. A method of preparing a catalyst according to claim 1 wherein said carrier is first impregnated with an aqueous solution of a molybdenum compound, and is thereafter impregnated with an aqueous solution of a cobalt compound.

4. A method according to claim 1 wherein the carrier is an alumina gel.

5. A method according to claim 1 wherein the carrier is an alumina-silica gel.

6. A method according to claim 1 wherein the carrier is a titania gel.

7. A method for preparing a catalyst consisting essentially of a minor proportion of cobalt oxide plus molybdenum oxide and a major portion of a carrier which comprises immersing an adsorbent alumina gel containing between about 3 and 8% by weight of silica in an aqueous ammoniacal ammonium molybdate solution to form a molybdenum-impregnated gel, drying said molybdenum-impregnated gel, activating said molybdenum-impregnated gel by heating, immersing said impregnated gel in an aqueous solution of cobaltous nitrate to form a cobalt-impregnated gel, drying said cobalt-impregnated gel and activating said cobalt-impregnated gel.

References Cited in the file of this patent

UNITED STATES PATENTS

| Number | Name | Date |
|---|---|---|
| 2,270,165 | Groll et al. | Jan. 13, 1942 |
| 2,296,406 | Spicer et al. | Sept. 22, 1942 |
| 2,393,288 | Byrns | Jan. 22, 1946 |
| 2,411,829 | Huffman | Nov. 26, 1946 |
| 2,486,361 | Nahin et al. | Oct. 25, 1949 |
| 2,499,255 | Parker | Feb. 28, 1950 |